US012773805B2

(12) United States Patent
Frykman

(10) Patent No.: US 12,773,805 B2
(45) Date of Patent: Oct. 27, 2026

(54) PANEL SAW ASSEMBLY

(71) Applicant: Milwaukee Electric Tool Corporation, Brookfield, WI (US)

(72) Inventor: Mark Frykman, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 349 days.

(21) Appl. No.: 18/484,173

(22) Filed: Oct. 10, 2023

(65) Prior Publication Data

US 2024/0123648 A1 Apr. 18, 2024

Related U.S. Application Data

(60) Provisional application No. 63/415,879, filed on Oct. 13, 2022.

(51) Int. Cl.
*B27B 9/04* (2006.01)
*B23D 47/02* (2006.01)

(52) U.S. Cl.
CPC ................ *B27B 9/04* (2013.01); *B23D 47/02* (2013.01)

(58) Field of Classification Search
CPC .. B27B 9/04; B27B 5/07; B23D 47/02; B23D 45/02; B23D 57/0092; B23Q 9/0042; B23Q 9/005; B23Q 9/0085; Y10T 83/7697; Y10T 83/8763
See application file for complete search history.

(56) References Cited

U.S. PATENT DOCUMENTS

| | | | | |
|---|---|---|---|---|
| 2,785,708 A * | 3/1957 | Krogen | B27B 5/07 | 83/462 |
| 2,833,320 A * | 5/1958 | Bennett | B27B 5/07 | 83/574 |
| 3,008,498 A * | 11/1961 | Olson | B23D 47/025 | 144/250.18 |
| 3,565,139 A * | 2/1971 | Olson | B27B 5/07 | 83/859 |
| 3,866,496 A * | 2/1975 | Payne | B23D 45/024 | 83/486 |
| 4,847,513 A * | 7/1989 | Katz | H02K 23/66 | 30/DIG. 1 |
| 5,473,968 A * | 12/1995 | Break | B23D 47/132 | 144/286.5 |
| 6,837,137 B2 * | 1/2005 | Ekern | B27B 5/07 | 248/676 |
| 2005/0183640 A1 * | 8/2005 | Fotia | A47B 3/002 | 108/115 |
| 2006/0032356 A1 * | 2/2006 | Newman, Jr. | B27B 5/075 | 83/489 |
| 2006/0060049 A1 * | 3/2006 | Learnard | B27B 27/02 | 83/485 |

(Continued)

*Primary Examiner* — Jonathan G Riley
(74) *Attorney, Agent, or Firm* — Michael Best & Friedrich LLP

(57) ABSTRACT

A panel saw assembly includes a stand including a post, a first arm coupled to a first side of the post, and a second arm coupled to a second side of the post opposite the first side. The panel saw assembly further includes a leg coupled to at least one of the first arm, the second arm, and the post for supporting the stand in an inclined orientation relative to a surrounding support surface, a track coupled to the stand, and a saw movable along the track. The first and second arms are adjustable relative to the post between a collapsed state and an opened state.

20 Claims, 4 Drawing Sheets

(56) References Cited

U.S. PATENT DOCUMENTS

| | | | | |
|---|---|---|---|---|
| 2010/0276910 | A1 * | 11/2010 | Wise | B25H 1/04 280/651 |
| 2018/0345391 | A1 * | 12/2018 | Ridgway | B27B 5/29 |
| 2022/0161455 | A1 | 5/2022 | VanDaalwyk et al. | |

* cited by examiner

PANEL SAW ASSEMBLY

CROSS-REFERENCE TO RELATED APPLICATIONS

This application claims priority to U.S. Provisional Patent Application No. 63/415,879, filed on Oct. 13, 2022, the entire content of which is incorporated herein by reference.

FIELD OF THE INVENTION

The present application relates to panel saws, and more particularly to stands for panel saws.

BACKGROUND OF THE INVENTION

Panel saws are typically used to cut large sheets of material. Such panel saws are typically very large and require a large storage area.

SUMMARY OF THE INVENTION

The present application provides, in one aspect, a panel saw assembly including a stand having a post, a first arm coupled to a first side of the post, and a second arm coupled to a second side of the post opposite the first side. The panel saw assembly further includes a leg coupled to at least one of the first arm, the second arm, and the post for supporting the stand in an inclined orientation relative to a surrounding support surface, a track coupled to the stand, and a saw movable along the track. The first and second arms are adjustable relative to the post between a collapsed state and an opened state.

The present application provides, in another aspect, a panel saw assembly including a stand, a track coupled to the stand, and a saw movable along the track. The stand includes a post and an arm including a plurality of cross-members pivotably coupled to a side of the post and a plurality of links pivotably coupled to the plurality of cross-members. The arm is adjustable relative to the post between a collapsed state and an opened state. Each of the plurality of cross-members is oriented substantially parallel to the post when the arm is in the collapsed state. Each of the plurality of cross-members is oriented substantially perpendicular to the post when the arm is in the opened state.

The present application provides, in another aspect, a panel saw assembly including a stand having a post and an arm coupled to a side of the post, a leg coupled to at least one of the post and the arm, a track selectively coupled to the stand, and a saw coupled to the track and movable along a cutting path. The arm is adjustable relative to the post between a collapsed state and an opened state. The track is configured to be moved relative to the stand in an adjustment direction along a width dimension of the stand when the arm is in the opened state. The cutting path is oriented substantially perpendicular to the adjustment direction.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
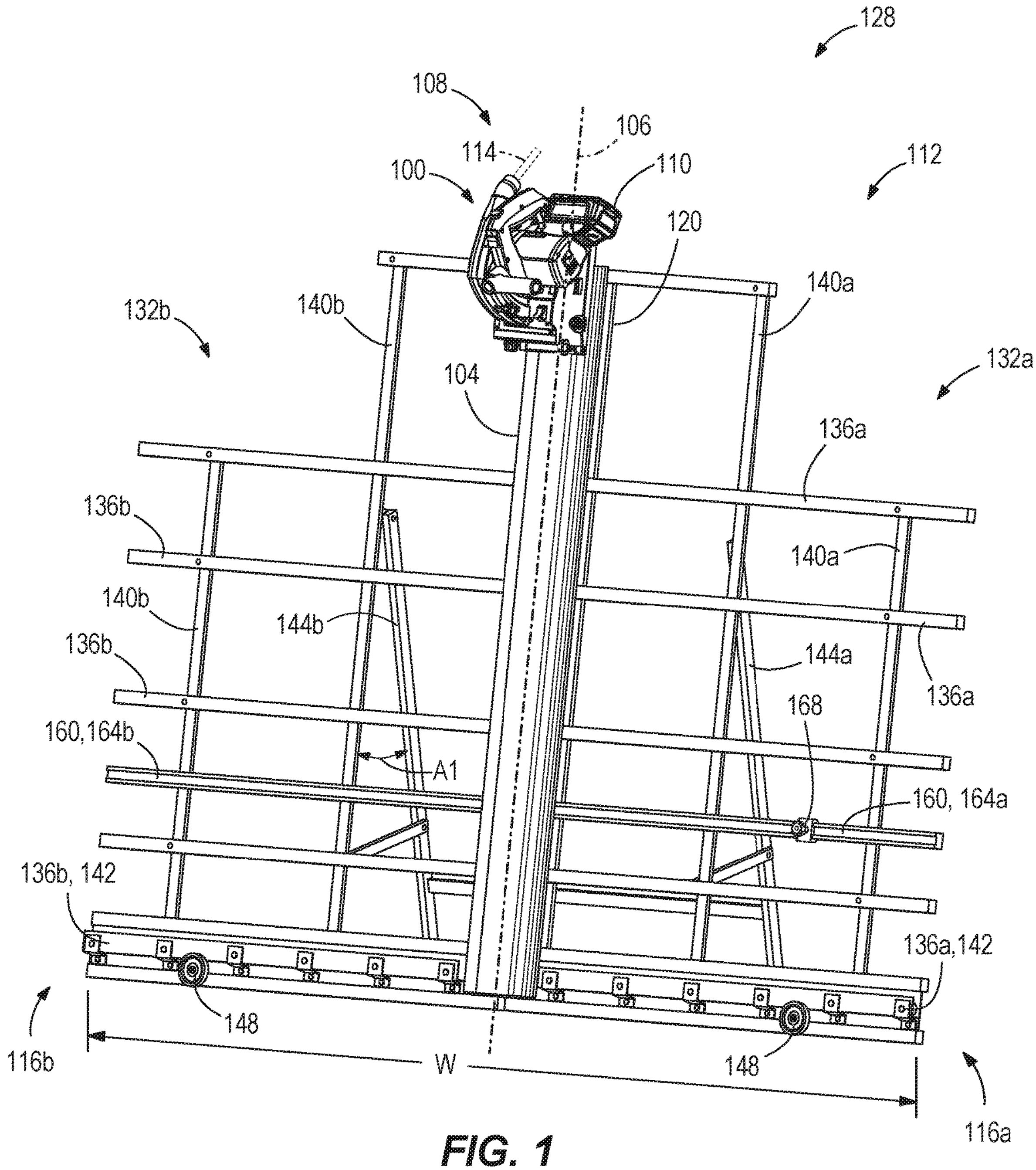
FIG. 1 is a perspective view of a panel saw assembly including a track saw assembly and foldable stand for use therewith.

FIG. 1 illustrates a plunging circular saw, such as a track saw 100, for use with a track 104. The track 104 defines a cutting path 106 (also referred to as a cutting axis 106), which extends along a length of the track 104. The track saw 100 is configured to move along the cutting path 106 of the track 104 to cut a workpiece (not shown). The workpiece may be, for example, a sheet of plywood, a sheet of particle board, etc. The track saw 100 may be corded or cordless. Said another way, the track saw 100 may be configured to receive a rechargeable battery pack 110 or may include a power cord 114 to connect to a remote power source (not shown). The combined track saw 100 and track 104 create a track saw assembly 108. The features of the track saw assembly 108 are further described in U.S. Non-Provisional application Ser. No. 17/532,261 filed Nov. 22, 2021, also U.S. Application Publication No. 2022/0161455 published May 26, 2022, the entire content of which is incorporated by reference herein.

Figure 2A:
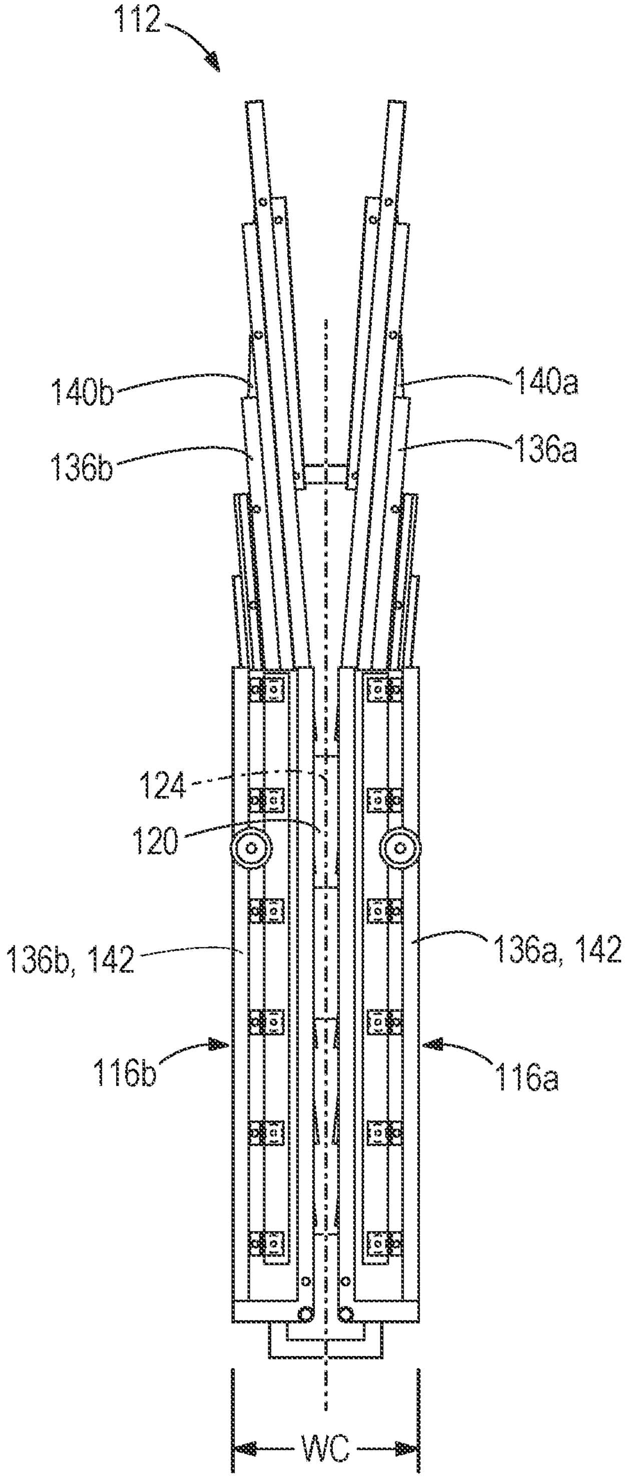
FIG. 2A is a front view of the stand of FIG. 1 in a collapsed state.
Figure 2B:
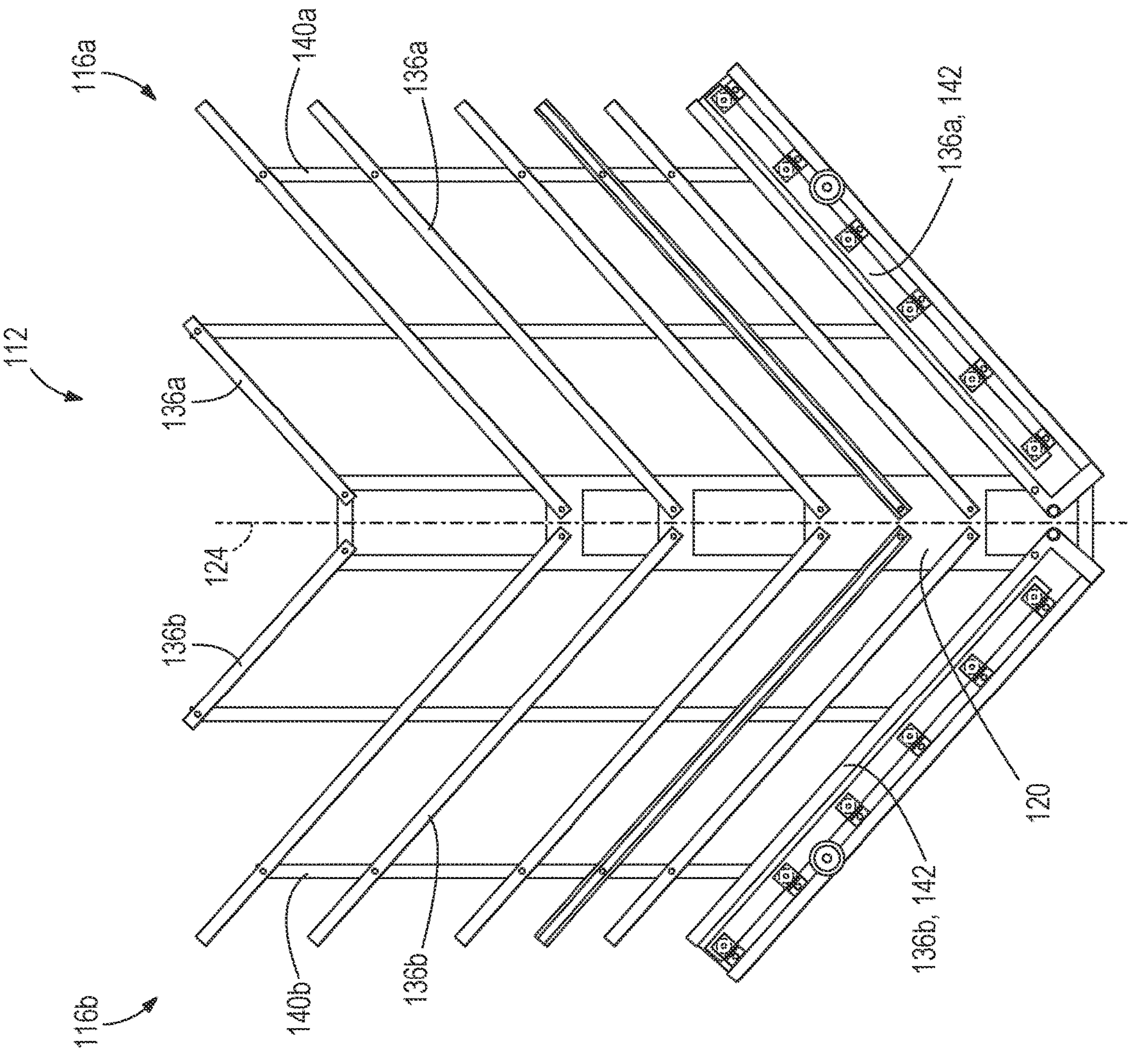
FIG. 2B is a front view of the stand of FIG. 1 in a semi-opened state.
Figure 2C:
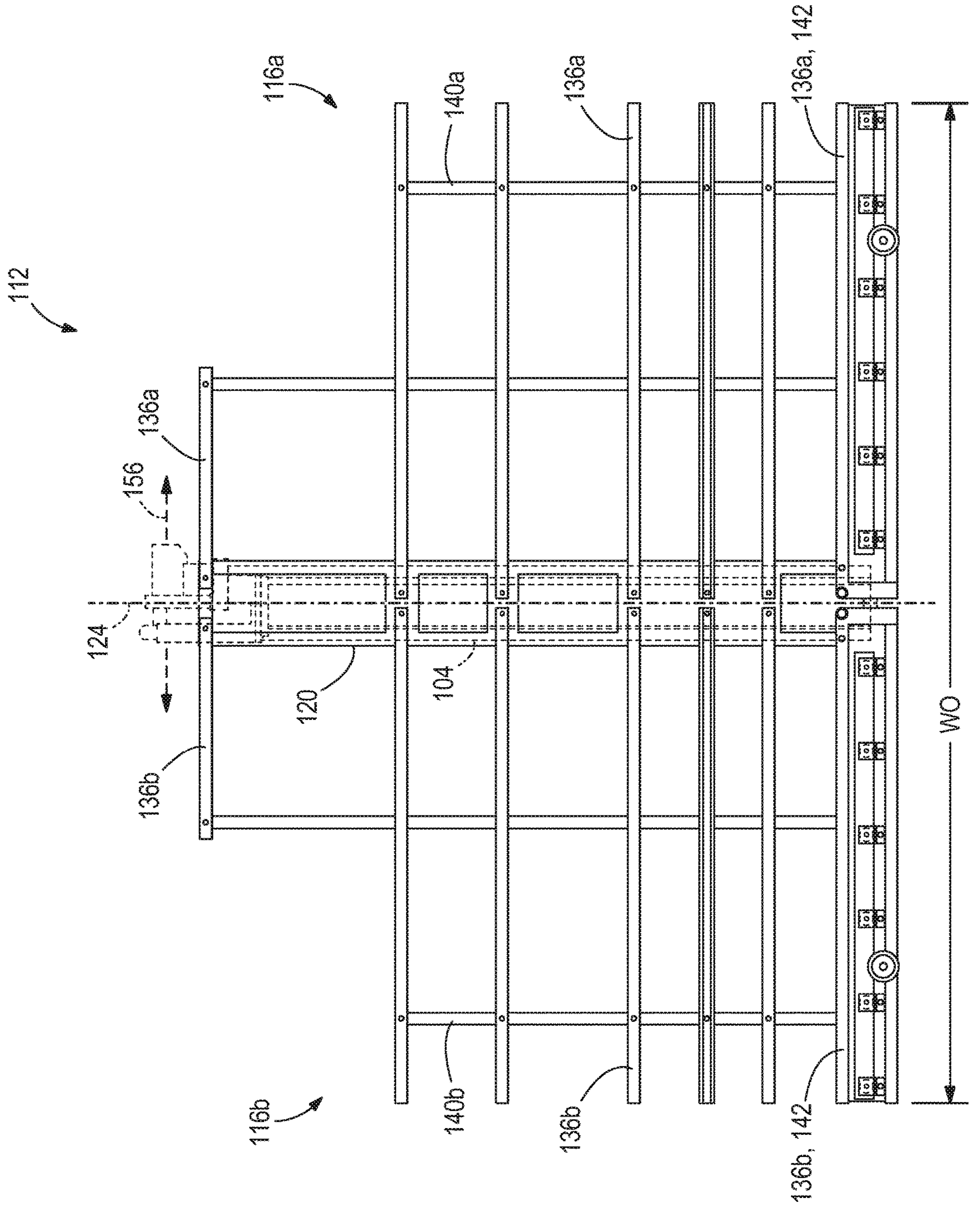
FIG. 2C is a front view of the stand of FIG. 1 in an opened state.

With continued reference to FIG. 1, the track saw assembly 108 and the workpiece are supported upon a stand 112. More specifically, the track 104 is coupled to the stand 112. The length of the track 104 coincides with a height of the stand 112 when the stand 112 is vertically oriented as shown in FIG. 1. In the illustrated embodiment, the stand 112 includes a first arm 116*a*, a second arm 116*b*, and a post 120 therebetween. The first and second arms 116*a*, 116*b* are pivotably coupled to the post 120. The first and second arms 116*a*, 116*b* are adjustable between a collapsed state (FIG. 2A) and an opened state (FIGS. 1 and 2C). In some embodiments, the first and second arms 116*a*, 116*b* are independently adjustable between the collapsed state and the opened state. In other embodiments, the first and second arms 116*a*, 116*b* are adjustable together between the collapsed state and the opened state. In these embodiments, the first and second arms 116*a*, 116*b* may be coupled together. The post 120 defines a central axis 124 (also referred to as a post axis 124) (FIGS. 2A-2C). The central axis 124 may define an axis of symmetry between the first and second arms 116*a*, 116*b*. In the illustrated embodiment, the track 104 is adjacent and aligned with the post 120. More specifically, the illustrated central axis 124 and the cutting path 106 define a central plane (not shown) that may define a plane of symmetry between the first and second arms 116*a*, 116*b*. The combined track saw assembly 108 and stand 112 create a panel saw assembly 128.

With continued reference to FIG. 1, the first arm 116*a* includes a plurality of first support members 132*a* and the second arm 116*b* includes a plurality of second support members 132*b*. The plurality of first support members 132*a* includes a plurality of first cross-members 136*a* and a plurality of first links 140*a*. The first cross-members 136*a* are pivotably coupled to the post 120. The first links 140*a* are pivotably coupled to the first cross-members 136*a*. When the first arm 116*a* is in the opened state (FIGS. 1 and 2C), the first cross-members 136*a* are oriented perpendicular to the post 120 and the first links 140*a*. In the illustrated embodiment, the first cross-members 136*a* are oriented horizontally, and the first links 140*a* are oriented vertically. Said another way, the first cross-members 136*a* are oriented parallel with a width W (also referred to as a width dimension W) of the stand 112, and the first links 140*a* are oriented parallel with the central axis 124. The plurality of second support members 132*b* includes a plurality of second cross-members 136*b* and a plurality of second links 140*b*. The second cross-members 136*b* can have the same features, function, and connections as the first cross-members 136*a*. The second links 140*b* can have the same features, function, and connections as the first links 140*a*.

With continued reference to FIG. 1, the lowermost first and second cross-members 136*a*, 136*b* collectively define a base 142 upon which a workpiece can be supported. In some embodiments, the stand 112 includes one or more legs 144*a*, 144*b* which, in combination with the base 142, support the stand 112 in an inclined manner relative to an underlying support surface. In the illustrated embodiment, a plurality of wheels 148 are coupled to the base 142. The wheels 148 are configured to contact the support surface and move the stand 112 along the support surface. In the illustrated embodiment, each of the first and second cross-members 136*a*, 136*b* of the base 142 includes one of the wheels 148. In some embodiments, each of the first and second cross-members 136*a*, 136*b* of the base 142 may include more wheels 148 (e.g., two, three, etc.). In other embodiments, the base 142 may not include wheels 148.

With continued reference to FIG. 1, the legs 144*a*, 144*b* are coupled to the stand 112 to stabilize the stand 112. In the illustrated embodiment, the legs 144*a*, 144*b* are coupled to the first and second arms 116*a*, 116*b*, respectively. More specifically, the leg 144*a* is pivotably coupled to one of the first links 140*a* and the leg 144*b* is pivotably coupled to one of the second links 140*b*. In some embodiments, a single leg may be coupled to the post 120. In other embodiments, more than two legs may be coupled to at least one of the first arm 116*a*, the second arm 116*b*, and the post 120. The legs 144*a*, 144*b* may be adjusted between a stored position (not shown) and a deployed position (FIG. 1). The legs 144*a*, 144*b* are collapsed against the first and second arms 116*a*, 116*b* in the stored position. The legs 144*a*, 144*b* are pivoted away from the first and second arms 116*a*, 116*b* in the deployed position to define an oblique included angle A1 with the links 140*a*, 140*b* to which the legs 144*a*, 144*b* are pivotably coupled. In some embodiments, the legs 144*a*, 144*b* are pivotable to one position, such that the angle A1 is fixed. In other embodiments, the legs 144*a*, 144*b* are pivotable to a plurality of positions, such that the angle A1 is adjustable. In some embodiments, the wheels 148 may only contact the support surface when the legs 144*a*, 144*b* are in the stored position.

With continued reference to FIG. 1, in some embodiments, the track saw assembly 108 may be adjustable along the width W of the stand 112. More specifically, the track 104 may be moved relative to the stand 112 in an adjustment direction 156 along the width W and secured in any of a plurality of positions (shown in FIG. 2C). In these embodiments, the cutting path 106 may be parallel with the central axis 124 and offset relative to the central axis 124 along the width W. The adjustment direction may be defined from the post 120 and along the first cross-members 136*a* when the first arm 116*a* is in the opened state. Alternatively, the adjustment direction may be defined from the post 120 and along the second cross-members 136*b* when the second arm 116*b* is in the opened state. In one non-limiting example, the track 104 may be slidably coupled to the first and second cross-members 136*a*, 136*b*. In this example, the track 104 may be slid to a desired position along the first and second cross-members 136*a*, 136*b* and subsequently secured (e.g., by a clamp, by a projection in the track 104 received in one of a plurality of notches in the first and second cross-members 136*a*, 136*b*, etc.) in the desired position.

With continued reference to FIG. 1, the stand 112 includes a measurement guide 160 (e.g., a ruler). The measurement guide 160 can include a plurality of markings, indicia, etc. to indicate distance. The measurement guide 160 extends along the first and second arms 116*a*, 116*b* and is oriented parallel with the width W. More specifically, the measurement guide 160 includes a first measurement portion 164*a* and a second measurement portion 164*b* (also referred to as a first ruler portion 164*a* and a second ruler portion 164*b*). The first and second measurement portions 164*a*, 164*b* are respectively coupled to the first and second arms 116*a*, 116*b*. The first and second measurement portions 164*a*, 164*b* are respectively adjustable with the first and second arms 116*a*, 116*b* between the opened state and the collapsed state. A slider 168 is slidably coupled to the measurement guide 160. The slider 168 is configured to move along the first and second measurement portions 164*a*, 164*b* of the measurement guide 160 and secure to the measurement guide 160 at a desired position. Together, the measurement guide 160 and the slider 168 assist a user with aligning the workpiece at a desired position relative to the track saw assembly 108. In some embodiments, the measurement guide 160 may be integrally formed with a portion of the stand 112 as a single piece. In one non-limiting embodiment, one the first cross-members 136*a* may define the first measurement portion 164*a*, and one of the second cross-members 136*b* may define the second measurement portion 164*b*. In these embodiments, the plurality of markings, indicia, etc. may be etched, printed, or stamped directly on the first and second cross-members 136*a*, 136*b*.

FIG. 2A illustrates the stand 112 with the first and second arms 116*a*, 116*b* in the collapsed state. When the first and second arms 116*a*, 116*b* are in the collapsed state, the stand 112 defines a collapsed width WC. In the illustrated embodiment, the first and second cross-members 136*a*, 136*b* of the base 142 respectively define first and second channels (not shown). The first links 140*a* and the remaining first cross-members 136*a* are received in the first channel, and the second links 140*b* and the remaining second cross-members 136*b* are received in the second channel. In the collapsed state, the first and second arms 116*a*, 116*b* are oriented substantially parallel to the post 120 and the central axis 124. More specifically, the first and second cross-members 136*a*, 136*b*, and the first and second links 140*a*, 140*b*, are oriented substantially parallel with the central axis 124. The stand 112 may be easily transported when in the collapsed state. In some embodiments, the stand 112 may include carrying features (e.g., a handle, a strap, etc.) coupled to the stand 112 to assist in moving the stand 112. In other embodiments, the stand 112 may also be rolled (e.g., by the wheels 148) when in the collapsed state. In some embodiments, the track saw assembly 108 may be coupled to the stand 112 when the stand 112 is in the collapsed state.

FIG. 2B illustrates the stand 112 with the first and second arms 116*a*, 116*b* in a semi-opened state. In the illustrated embodiment, the first and second cross-members 136*a*, 136*b* are obliquely oriented relative to the central axis 124 and the first and second links 140*a*, 140*b* are oriented substantially parallel with the central axis 124 in the semi-opened state. In other embodiments, the first and second links 140*a*, 140*b* may be obliquely oriented relative to the central axis 124 in the semi-opened state. In some embodiments, the track saw assembly 108 may be coupled to the stand 112 when the stand 112 is in the semi-opened state.

FIG. 2C illustrates the stand 112 with the first and second arms 116*a*, 116*b* in the opened state. When the first and second arms 116*a*, 116*b* are in the opened state, the stand 112 defines an opened width WO. The opened width WO is greater than the collapsed width WC (FIG. 2A). In the illustrated embodiment, the first and second cross-members 136*a*, 136*b* are oriented substantially perpendicular to the central axis 124 and the first and second links 140*a*, 140*b* are oriented substantially parallel with the central axis 124 in the opened state. In the opened state, the track saw assembly 108 may be attached or otherwise supported upon the stand 112. As described above, the track saw assembly 108 may be adjusted along the width W (or the width WO) to provide different cuts on the workpiece also supported upon the stand 112.

In some embodiments, the first and second arms 116*a*, 116*b* may be locked (e.g., by a clip, a strap, a fastener, etc.) in the collapsed state and/or the opened state. In one non-limiting embodiment, each of the first and second cross-members 136*a*, 136*b* of the base 142 may include an aperture (not shown), and the post 120 may include a pair of projections (not shown). The projections may be biased outward (e.g., by a spring). When in the collapsed and the opened state, each aperture receives one of the projections to secure the first and second arms 116*a*, 116*b* to the post 120 in the collapsed state or the opened state. A user may subsequently depress the projections (e.g., against the bias of the springs) to remove the projections from the recesses. In another non-limiting embodiment, each of the first and second cross-members 136*a*, 136*b* of the base 142 may include a first aperture (not shown) and a second aperture (not shown), and the post 120 may include a pair of projections (not shown). The projections may be biased outward. When in the collapsed state, each first aperture receives one of the projections to secure the first and second arms 116*a*, 116*b* to the post 120 in the collapsed state. When in the opened state, each second aperture receives one of the projections to secure the first and second arms 116*a*, 116*b* to the post 120 in the opened state.

The panel saw assembly 128 may be assembled by adjusting the first and second arms 116*a*, 116*b* to the opened state. If, for example, the stand 112 is locked in the collapsed state, a user can unlock each of the first and second arms 116*a*, 116*b*. The user will then pivot each of the first and second arms 116*a*, 116*b* from the collapsed state to the semi-opened state and then to the opened state. The user may then lock each of the first and second arms 116*a*, 116*b* in the locked state. The leg 144 may then be coupled to the stand 112 and adjusted between the stored position and the deployed position. The leg 144 may be adjusted to the deployed position prior to adjusting the first and second arms 116*a*, 116*b* from the collapsed state to the opened state. At this point, the stand 112 may be supported on the support surface by the base 142 and the leg 144. The track 104 is then coupled to the stand 112. In some embodiments, the track 104 may have already been coupled to the stand 112 when the stand was in the collapsed state. With the track 104 coupled to the stand 112, the track saw 100 may be coupled to the track 104 for sliding thereon. The track saw 100 may then receive power (e.g., by the rechargeable battery pack, the power cord, etc.).

Once assembled, the panel saw assembly 128 may be operated. In some embodiments the track 104 is fixedly coupled to the stand 112. In these embodiments, the panel saw assembly 128 is operated by positioning a workpiece in a desired position by using the measurement guide 160 and/or the slider 168. The track saw 100 may then be moved along the cutting path 106 to cut the workpiece. In other embodiments, the track 104 is adjustable along the width W of the stand 112. In these embodiments, the track 104 may be adjusted to a desired position along the width W of the stand 112. The track 104 may be secured in the desired position (e.g., by a clamp, by a projection in the track 104 received in one of a plurality of notches in the first and second cross-members 136*a*, 136*b* of the base 142, etc.). A workpiece is then positioned in a desired position by using the measurement guide 160 and/or the slider 168. The track saw 100 may then be moved along the cutting path 106 to cut the workpiece.

Although the invention has been described in detail with reference to certain preferred embodiments, variations and modifications exist within the scope and spirit of one or more independent aspects of the invention as described.

Various features of the invention are set forth in the following claims.

What is claimed is:

1. A panel saw assembly comprising:
- a stand including
  - a post,
  - a first arm pivotably coupled to a first side of the post, and
  - a second arm pivotably coupled to a second side of the post opposite the first side;
- a leg coupled to at least one of the first arm, the second arm, and the post for supporting the stand in an inclined orientation relative to a surrounding support surface;
- a track coupled to the stand; and
- a saw movable along the track;
- wherein the first and second arms are adjustable relative to the post between a collapsed state and an opened state.

2. The panel saw assembly of claim 1, wherein
- the stand defines a collapsed width when the first and second arms are in the collapsed state,
- the stand defines an opened width when the first and second arms are in the opened state, and
- the opened width is greater than the collapsed width.

3. The panel saw assembly of claim 1, wherein
- a ruler is coupled to the stand, the ruler having a first ruler portion and a second ruler portion,
- the first ruler portion is coupled to the first arm and is adjustable between the collapsed state and the opened state with the first arm, and
- the second ruler portion is coupled to the second arm and is adjustable between the collapsed state and the opened state with the second arm.

4. The panel saw assembly of claim 1, wherein the first and second arms are configured to be locked in the collapsed state and the opened state.

5. The panel saw assembly of claim 1, wherein the first and second arms are oriented substantially parallel with the post when the first and second arms are in the collapsed state.

6. The panel saw assembly of claim 1, wherein
- the post defines a post axis, the track defines a cutting axis, and the post axis is parallel with the cutting axis.

7. The panel saw assembly of claim 1, wherein the leg is pivotably coupled to at least one of the first arm, the second arm, or the post between a stored position and a deployed position, the leg is collapsed against the at least one of the first arm, the second arm, or the post in the stored position, and the leg is pivoted away from the at least one of the first arm, the second arm, or the post in the deployed position.

8. The panel saw assembly of claim 1, wherein a plurality of wheels are coupled to the first and second arms, the plurality of wheels configured to move the panel saw assembly along a surface.

9. The panel saw assembly of claim 8, wherein the leg is pivotably coupled to at least one of the first arm, the second arm, or the post between a stored position and a deployed position, and wherein the plurality of wheels are configured to move the panel saw assembly along a surface when the leg is in the stored position.

10. The panel saw assembly of claim 1, wherein the saw includes a rechargeable battery pack to power the saw.

11. The panel saw assembly of claim 1, wherein the saw includes a power cord, the power cord configured to connect to a power source.

12. A panel saw assembly comprising:

a stand including a post, and an arm including a plurality of cross-members pivotably coupled to a side of the post and a plurality of links pivotably coupled to the plurality of cross-members, the arm adjustable relative to the post between a collapsed state and an opened state, each of the plurality of cross-members oriented substantially parallel to the post when the arm is in the collapsed state, and each of the plurality of cross-members oriented substantially perpendicular to the post when the arm is in the opened state;

a track coupled to the stand; and a saw movable along the track.

13. The panel saw assembly of claim 12, wherein the arm is a first arm, the side of the post is a first side of the post, the plurality of cross-members is a plurality of first cross-members, and the plurality of links is a plurality of first links, and the panel saw assembly further comprises a second arm including a plurality of second cross-members pivotably coupled a second side of the post opposite the first side and a plurality of second links pivotably coupled to the plurality of second cross-members, the second arm adjustable relative to the post between a collapsed state and an opened state, each of the plurality of second cross-members oriented substantially parallel to the post when the second arm is in the collapsed state, and each of the plurality of second cross-members oriented substantially perpendicular to the post when the second arm is in the opened state.

14. The panel saw assembly of claim 12, wherein the plurality of links are oriented substantially parallel to the post when the arm is in the collapsed state and the opened state.

15. The panel saw assembly of claim 12, wherein the track is selectively coupled to the stand, and wherein the track is configured to be moved along the plurality of cross-members when the arm is in the opened state.

16. A panel saw assembly comprising:

a stand including a post and an arm pivotably coupled to a side of the post, the arm adjustable relative to the post between a collapsed state and an opened state;

a leg coupled to at least one of the post and the arm;

a track selectively coupled to the stand, the track configured to be moved relative to the stand in an adjustment direction along a width dimension of the stand when the arm is in the opened state; and a saw coupled to the track and movable along a cutting path, the cutting path oriented substantially perpendicular to the adjustment direction.

17. The panel saw assembly of claim 16, wherein the track is configured to be selectively locked in a plurality of different positions along the adjustment direction.

18. The panel saw assembly of claim 16, wherein the arm is a first arm coupled to a first side of the post, the stand further includes a second arm coupled to a second side of the post opposite the first side, the second arm is adjustable relative to the post between a collapsed state and an opened state, and the track is configured to be moved relative to the stand in the adjustment direction along the width dimension when the first and second arms are in the opened state.

19. The panel saw assembly of claim 16, wherein the stand defines a collapsed width when the arm is in the collapsed state, the stand defines an opened width when the arm is in the opened state, and the opened width is greater than the collapsed width.

20. The panel saw assembly of claim 16, wherein the arm is oriented substantially parallel with the post when the arm is in the collapsed state.

* * * * *